Oct. 25, 1927.                                                   1,646,900
A. DE LATHAUWER
APPARATUS FOR BRAKING RAILWAY VEHICLES
Filed July 21, 1925                           4 Sheets-Sheet 1
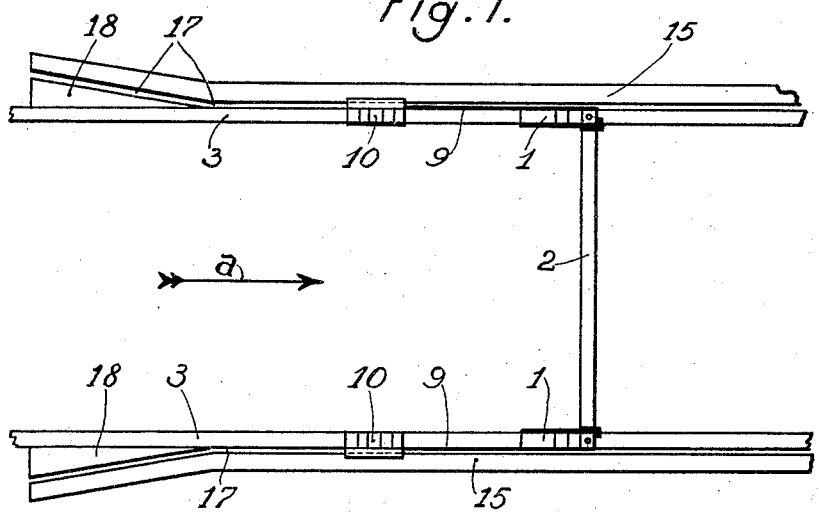
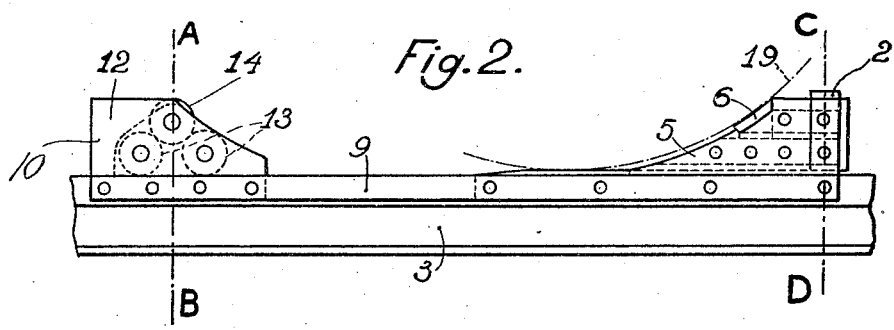
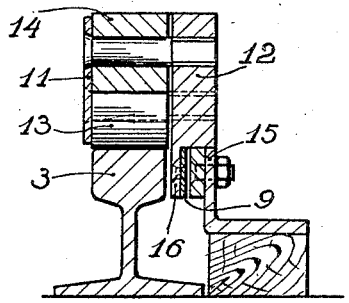 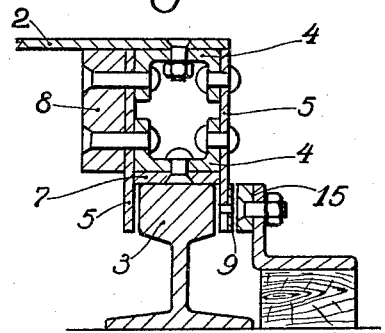

Oct. 25, 1927. 1,646,900
A. DE LATHAUWER
APPARATUS FOR BRAKING RAILWAY VEHICLES
Filed July 21, 1925  4 Sheets-Sheet 2
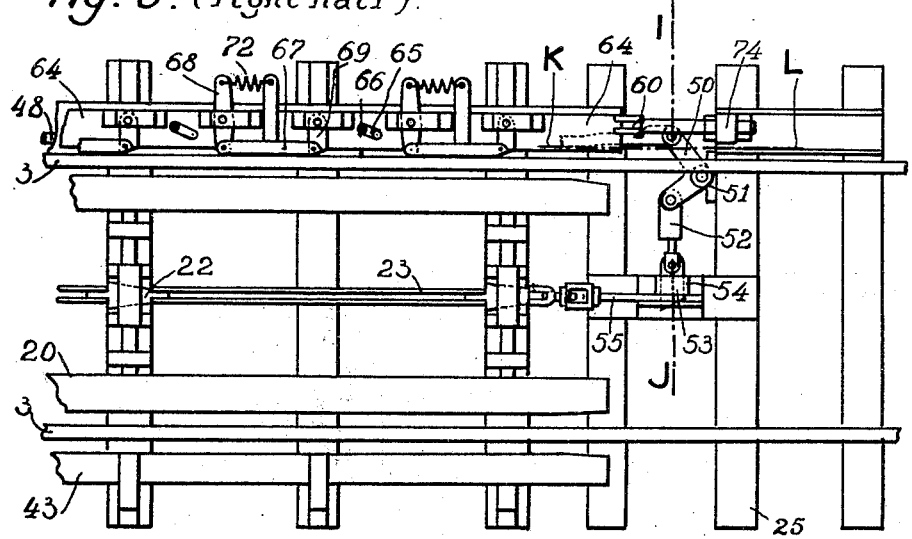
Fig. 5. (right half).
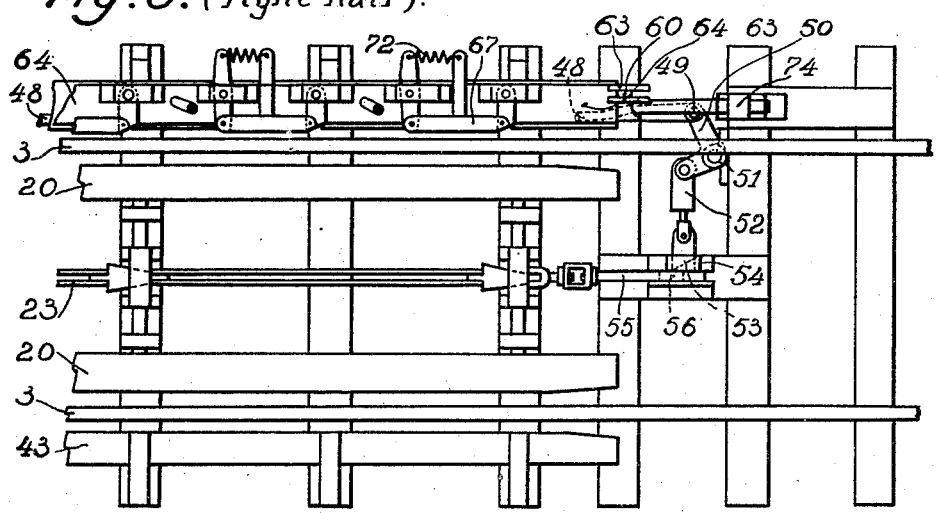
Fig. 6. (right half).
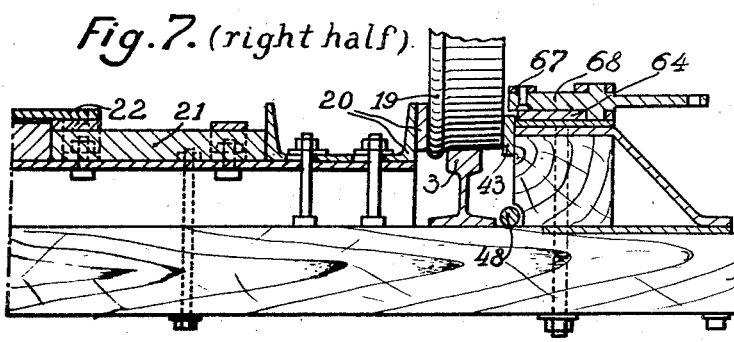
Fig. 7. (right half).

Oct. 25, 1927. 1,646,900
A. DE LATHAUWER
APPARATUS FOR BRAKING RAILWAY VEHICLES
Filed July 21, 1925  4 Sheets-Sheet 3
Fig. 5. (left half).
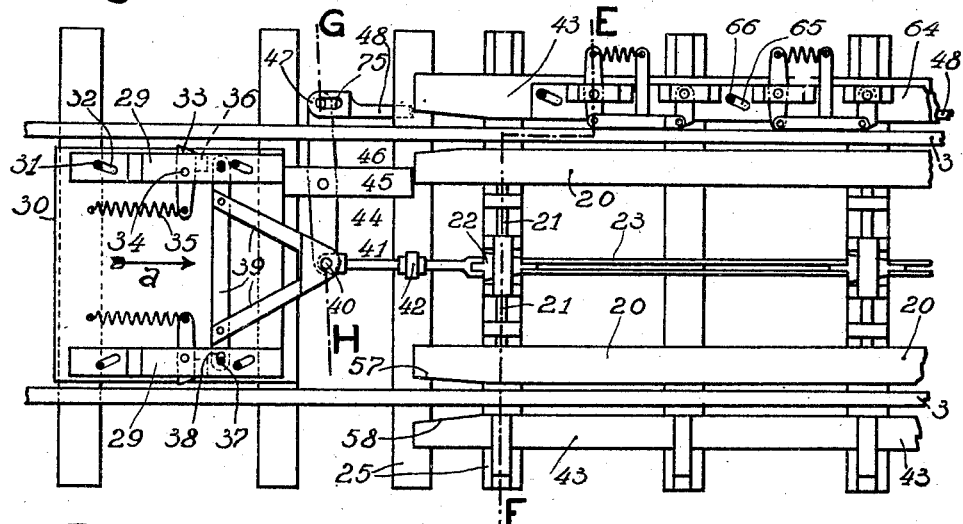
Fig. 6. (left half).
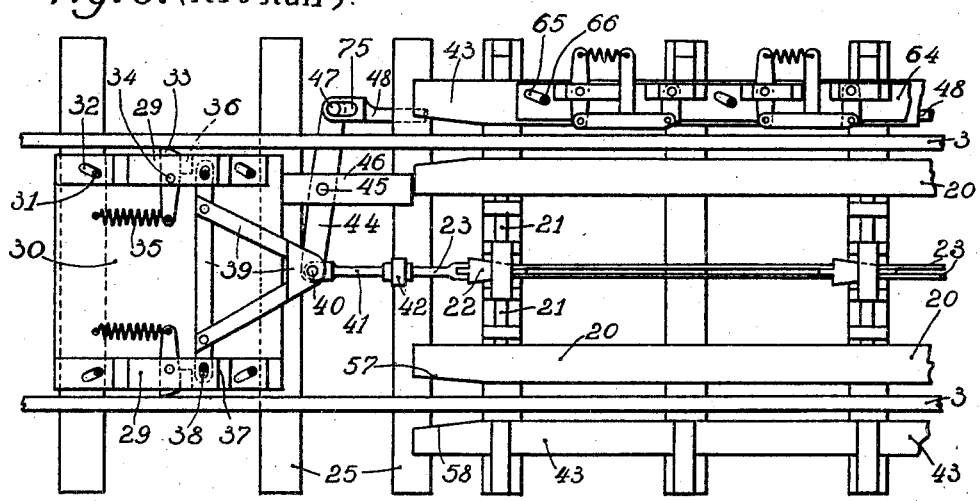
Fig. 7. (left half).
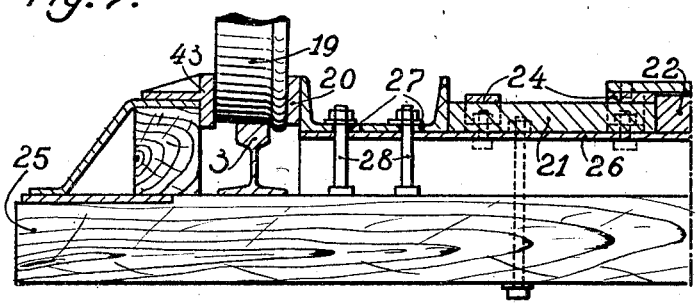
Inventor
A. De Lathauwer
By Marks & Clerk
attys.

Oct. 25, 1927.  1,646,900
A. DE LATHAUWER
APPARATUS FOR BRAKING RAILWAY VEHICLES
Filed July 21, 1925   4 Sheets-Sheet 4
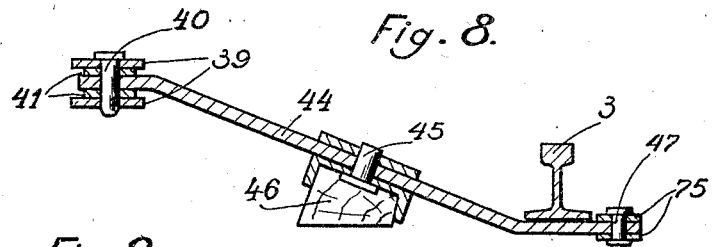
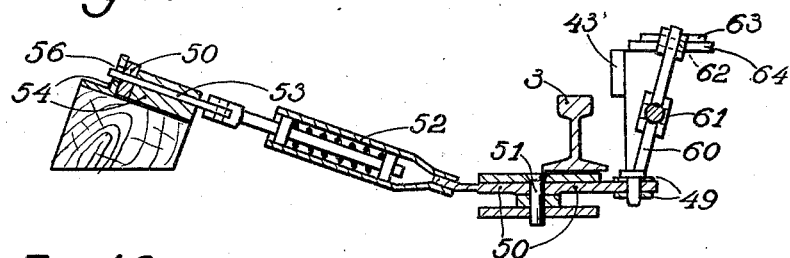
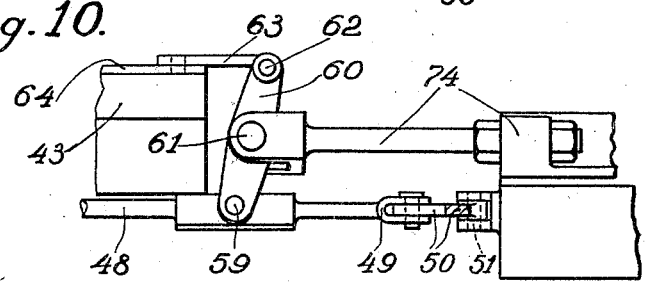
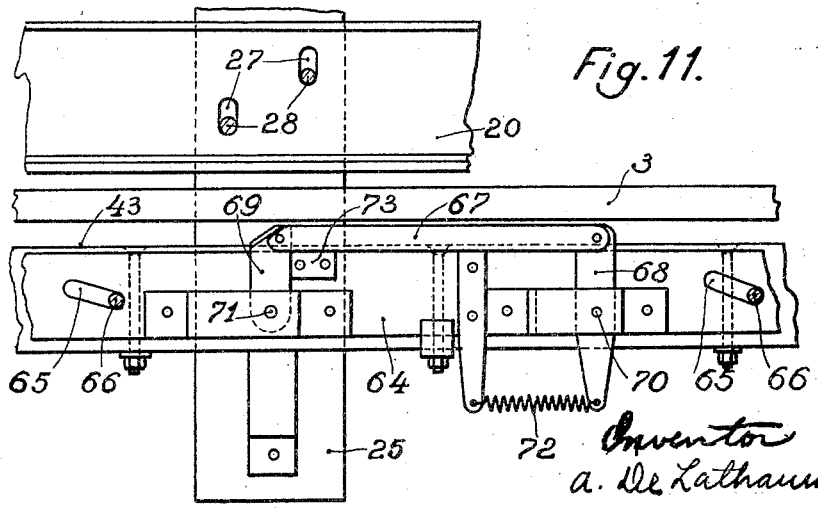
Inventor
A. De Lathauwer
By Marks & Clerk
attys.

Patented Oct. 25, 1927.

1,646,900

UNITED STATES PATENT OFFICE.

ARTHUR DE LATHAUWER, OF FLAWINNE, BELGIUM.

APPARATUS FOR BRAKING RAILWAY VEHICLES.

Application filed July 21, 1925, Serial No. 45,053, and in Belgium July 26, 1924.

This invention has reference to apparatus adapted to be set or mounted on railway tracks and more particularly on shunting tracks and sorting sidings in order to brake the cars before they reach the buffer stops and to prevent damages to said stops as well as to the rolling stock and the goods carried thereby.

The apparatus according to the invention comprises a double braking block placed on the track rails and connected to a double carriage which is normally held out of the path of the wheels by diverging guides so that the first pair of wheels travelling past the guides will push the braking block with the carriage trailing behind the wheels, while in the reverse direction said pair of wheels will push the carriage until it is deflected by the diverging guides and has cleared the track after having brought the braking block back to its initial position.

While this block causes the vehicles to be uniformly braked from a given place, without requiring any attention, the braked vehicles will then run over a distance depending on their momentum. When it is required to stop them within a given distance the braking action must be completed by a stationary apparatus mounted on the track at the desired distance from the braking block and adapted to be operated by said block.

This apparatus is of the kind in which braking bars are arranged between and parallel to the rails of the track and according to this invention it is provided with an operating mechanism adapted to be actuated by the braking block. A transmitting mechanism then operates a latch which locks the apparatus in braking position. This transmitting mechanism is further connected to a set of dogs which, when the vehicles are withdrawn from the apparatus, are operated by the vehicle wheels and cause the transmitting mechanism to return the latch, the braking bars and their operating mechanism to their initial positions.

In the accompanying drawings showing by way of example a constructional form of the invention:

Fig. 1 is a plan view of the double block and carriage with the diverging guides on the track.

Fig. 2 is an elevation of the block on a larger scale, and Figs. 3 and 4 are cross-sections on a still larger scale, taken respectively on lines A—B and C—D of Fig. 2.

Figs. 5 and 6 are plan views of the braking apparatus in two different positions.

Figs. 7, 8, 9 and 10 are cross-sections on a larger scale, taken respectively on lines E—F, G—H, I—J and L—K of Fig. 5.

Fig. 11 is a plan view on an enlarged scale of the dogs for returning the apparatus to normal position.

The double braking block (Fig. 1) comprises two shoes 1 connected with each other by a rigid cross-bar 2 and resting each on one of the rails 3 of the track. These shoes are conveniently made of U-irons 4 (Fig. 4) riveted to side plates 5 embracing the rail 3. They have on their rear curved side an abutment 6 adapted to be engaged by the wheels, and they are further provided with a bottom plate 7 slidably engaging the rail and with a lateral abutment 8 adapted to engage the operating mechanism of the braking apparatus.

To one of the side plates 5 of each shoe is secured a spring plate 9 secured at its other end to a carriage 10 herein shown to comprise side plates 11, 12 (Fig. 3) in which are rotatably mounted two rollers 13 resting on the rail and a third roller 14 frictionally engaging the rollers 13 and projecting beyond the side plates 11, 12 (Fig. 2).

The side plate 12 of each carriage 10 rests on a guide 15 extending parallel to and externally of the track. A downward extension 16 of the plate 12 projects into the groove or slit 17 formed between the rail 3 and the guide 15. The spring plate 9 is secured to this extension 16 and is guided with it in the slit 17 when the braking block is moved along the track.

At a suitable point of the track, wedges 18, which may be of wood covered with sheet metal, are secured to the outer sides of the rails while the guides 15 and grooves 17 are deflected outwardly as shown in Fig. 1. The upper side of the wedges 18 is flush with that of the rail head so that the carriages guided on the grooves 17 can freely pass from the wedges 18 to the rails 3 and vice-versa.

Normally the carriages 10 rest on the wedges 18 and leave the track clear so that the first pair of wheels 19 of a vehicle or train travelling in the direction of arrow *a* will strike against the abutments 6 of the braking block and push it forward while the carriages 10 guided in the grooves 17 will follow immediately behind the wheels 19 (Fig. 2), the progress of the vehicle or vehicles being gradually checked by the braking action of the shoes 1.

When the vehicle is moved in the reverse direction, the wheels 19 meet the rollers 14, and cause these to rotate the rollers 13 along the track, without appreciable resistance, until the carriages 10 are deflected by the wedges 18 and clear the track, the braking block then having resumed its initial position.

In order to stop the vehicles at a predetermined distance from the wedges 18 use is made of the automatic apparatus shown in Figs. 5 to 11, which comprises the braking bars 20 adapted to be pushed outwardly towards the rails 3 by struts 21 operated by wedges 22 connected to a rod 23 extending axially of the track. The struts 21 are guided in yokes 24 secured to girders 26 mounted on the sleepers 25 and the braking bars 20 are provided with slots 27 and guided by bolts 28 secured to the girders 26 (Fig. 7).

The rod 23 is moved longitudinally by two slides 29 resting on a sole plate 30 and provided with inclined slots 31 engaged by pins 32 secured to the sole plate 30. Dogs 33 are pivotally mounted on the slides 29 at 34 and are yieldingly held by springs 35 against stops 36 on the slides 29.

The dogs 33 (Fig. 6) normally project into the path of the block 1 and when said block is pushed by a vehicle in the direction of the arrow *a*, its abutments 8 strike the dogs 33, and the slides 29 guided by their pin and slot connection with the sole plate 30 are pushed forwardly and inwardly (Fig. 5) until the passage for the block 1 is cleared.

It should be stated here that while it might seem possible to operate the dogs 33 by means of the vehicle wheels, this is not feasible in practice; if the braking block 1 were dispensed with, the wheels travelling at an appreciable speed would strike the dogs 33 with a tremendous force and push them downwardly, and breakage of the parts could not be avoided.

The slides 29 are connected by pins 37 and slots 38 with a frame 39 which in turn is connected by pin 40, rod 41 and joint 42 with the rod 23 for actuating the wedges 22.

All these parts being pushed forward the struts 21 are caused to move the bars 20 outwardly so that the wheels 19 entering the apparatus are strongly pressed between said bars and outer guides 43 secured to the sleepers 25 (Fig. 7).

To the pin 40 is pivoted one end of a lever 44 (Figs. 5, 6, 8) pivotally mounted on an inclined pin 45 carried by a support 46 secured to the sleepers. This lever 44 extends under one of the rails 3 and its end adjacent the rail carries a pin 47 engaging in a slot 75 formed in one end of the rod 48 of the transmitting mechanism above referred to. The rod 48 extends parallel to the track and its other end 49 is pivoted to a bell crank lever 50 pivoted at 51 and connected by a spring member 52 to a latch 53 adapted to slide in a guide 54 secured to the sleepers 25 (Figs. 5, 6, 9, 10). In the guide 54 extends, at right angles to the latch 53, an extension 55 of the rod 23 in which is provided an opening 56. When the slides 29 and bars 20 are moved from the position of Fig. 5 to that of Fig. 6, the rod 48 is moved by the lever 44 in reverse direction to the rod 23 and the latch 53 is pushed by the lever 50 into the opening 56 and locks the rod 23 and bars 20 in their operative positions. These movements are controlled by the slides 29 before the wheels are engaged between the bars 20 and guides 43, so that they take place without appreciable resistance and locking is effected before the wheels 19 reach the flaring end surfaces 57, 58 of the braking members 20 and 43.

In order automatically to return the apparatus to the position of Fig. 6 when the vehicles are withdrawn in the reverse direction use is made of the following arrangement: At a point 59 near its end 49 the rod 48 is pivotally connected to a short lever 60 pivotally mounted on a pin 61 carried by a fixed support 74 (Fig. 10). This lever 60 is pivoted at 62 to a lug 63 secured to a slide 64 extending over the greater part of the length of the adjacent guide 43. The slide 64 has inclined slots 65 through which extend fixed guiding pins 66 (Figs. 5, 6, 11). Projecting towards the rail 3 are a number of dogs comprising each a bar 67 pivoted to a pair of short levers 68, 69 pivotally mounted on the slide 64 at 70, 71, respectively. These dogs are normally held in the position illustrated in the drawings by springs 72 which yieldingly press the levers 69 against stops 73 on the slide 64.

When the wedges 22 are driven between the struts 21 the slide 64 is pulled by the rod 48 and lever 60 in the same direction as the rod 23 and at the same time it is moved towards the rail 3 by the co-operation of the pins 66 and slots 65. The dogs 67 are thus moved into the path of the wheel tires, but owing to their pivotal connections with the slide 64 they are deflected laterally by the incoming wheels and are then returned to the illustrated position by the springs 72.

When the vehicles are forcibly withdrawn in the reverse direction, by an engine for example, the pair of wheels nearest one of the dogs 67 encounters said dog and pushes it against its stop 73, whereby the slide 64 is moved obliquely and clears the passage for the wheels. By the lever 60 the movement of the slide 64 is transmitted in the reverse direction to the rod 48 which first withdraws the latch 53 from the opening 56 and then causes the lever 44 to return the rod 23 and slides 29 to the position of Fig. 6, whereupon the wheels have no difficulty in driving the braking bars 20 back to their initial position. The slot 75 is so proportioned that the lever 44 is not operated until the latch 53 is withdrawn from the opening 56.

The described braking block and apparatus permit of braking any number of vehicles within a given distance, thus affording a reliable protection to the buffer stops. The apparatus may be combined with a signal for indicating its position and changes may be made in the construction illustrated without departing from the scope of the appended claims.

I claim:

1. Apparatus for braking railway vehicles comprising, in combination with the rails of a railway track, a braking block adapted to travel on said rails and comprising a pair of shoes and a pair of carriages yieldingly connected with said shoes, stationary means for deflecting said carriages from the rails, stationary braking means arranged on the track beyond said deflecting means, and means on said braking block for operating said stationary braking means.

2. Apparatus for braking railway vehicles comprising, in combination with the rails of a railway track, a braking block adapted to travel on said rails and comprising a pair of shoes and a pair of carriages yieldingly connected with said shoes, stationary means for deflecting said carriages from the rails, and stationary braking means arranged on the track beyond said deflecting means and comprising a pair of braking bars, means operated by said shoes for moving said bars towards the rails, and means operated by the vehicle wheels for releasing said bars.

3. Apparatus for braking railway vehicles comprising, in combination with the rails of a railway track, a braking block adapted to travel on said rails and comprising a pair of shoes and a pair of carriages yieldingly connected with said shoes, lateral abutments on said shoes, stationary means for deflecting said carriages from the rails, and stationary braking means arranged on the track beyond said deflecting means and comprising a pair of slides adapted to be moved by the abutments on said shoes, a pair of braking bars mounted for movement towards the rails, a latch for locking said braking bars in operative position and means for releasing said braking bars, said bars, latch and releasing means being controlled by said slides.

4. Apparatus for braking railway vehicles comprising, in combination with the rails of a railway track, a travelling braking block for braking the vehicles from a given point on the track, and stationary means for completing the braking action at a predetermined distance from said point comprising a pair of slides having spring dogs adapted to be engaged by said block, a rod movable longitudinally of the track and connected to said slides, wedges on said rod, a pair of braking bars adapted to be driven towards the rails by said wedges, means for locking said rod in operative position, means for releasing said braking bars, and means for connecting with each other said slides, locking means and releasing means.

5. Apparatus for braking railway vehicles comprising, in combination with the rails of a railway track, a travelling braking block for braking the vehicles from a given point on the track, and stationary means for completing the braking action at a predetermined distance from said point and comprising operating means mounted for actuation by said braking block, braking bars, locking means for said bars, releasing means for said bars, and means for interconnecting said operating means, braking bars, locking means and releasing means including a pin and slot connection between said operating means and braking bars on the one hand and said locking and releasing means on the other.

6. Apparatus for braking railway vehicles comprising, in combination with the rails of a railway track, a travelling braking block for braking the vehicles from a given point on the track, and stationary means for completing the braking action at a predetermined distance from said point and comprising a pair of slides, oblique guiding means for said slides, spring dogs on said slides adapted to be engaged by said braking block, a pair of braking bars mounted for movement towards said rails, an operating rod connected to said slides, wedges on said rod for operating said braking bars, a transmitting rod extending parallel to the rails, a rock lever having its ends respectively connected to both said rods, a latch connected to said transmitting rod adapted to lock said operating rod with its wedges in their operative position, a sliding bar connected to said transmission rod, oblique guiding means for said sliding bar, and spring dogs on said sliding bar adapted to be engaged by the vehicle wheels.

7. Apparatus for braking railway vehicles comprising in combination with the rails of a railway track, a travelling braking block for braking the vehicles from a given point on the track, and stationary means for completing the braking action at a predetermined distance from said point and comprising braking bars, means for operating said bars, said operating means being mounted for actuation by said block, and means for returning said operating means to its initial position comprising a slide, oblique guiding means for said slide and spring dogs on said slide adapted to be engaged by the vehicle wheels.

ARTHUR DE LATHAUWER.